United States Patent [19]
Asai et al.

[11] Patent Number: 5,850,488
[45] Date of Patent: Dec. 15, 1998

[54] CHARACTER GENERATING METHOD AND APPARATUS USING DISCRIMINATION OF STORED FONT DATA

[75] Inventors: Akira Asai, Atsugi; Masayoshi Tachihara, Tokyo, both of Japan

[73] Assignee: Canon Kabushiki Kaisha, Tokyo, Japan

[21] Appl. No.: 585,709

[22] Filed: Jan. 16, 1996

Related U.S. Application Data

[63] Continuation of Ser. No. 168,382, Dec. 17, 1993, abandoned.

[30] Foreign Application Priority Data

Dec. 22, 1992 [JP] Japan ................................. 4-356702
Jun. 30, 1993 [JP] Japan ................................. 5-161408

[51] Int. Cl.$^6$ ............................. G06K 9/42; H04N 1/40
[52] U.S. Cl. ..................... 382/298; 382/299; 382/300; 358/459; 345/467
[58] Field of Search .................... 382/298, 299, 382/300, 256, 237; 358/455, 459; 395/110, 150, 151; 345/467

[56] References Cited

U.S. PATENT DOCUMENTS

| | | | |
|---|---|---|---|
| 4,674,046 | 6/1987 | Ozeki et al. | 364/414 |
| 4,894,776 | 1/1990 | Dekel | 364/413.13 |
| 4,907,282 | 3/1990 | Daly et al. | 382/9 |
| 5,258,854 | 11/1993 | Eschbach | 358/445 |
| 5,287,209 | 2/1994 | Hiratsuka et al. | 358/459 |
| 5,337,167 | 8/1994 | Hiratsuka et al. | 358/459 |
| 5,339,171 | 8/1994 | Fujisawa et al. | 358/458 |
| 5,404,431 | 4/1995 | Kumazaki et al. | 395/143 |

FOREIGN PATENT DOCUMENTS

| | | | |
|---|---|---|---|
| 0435575 | 7/1991 | European Pat. Off. | G06K 15/10 |

OTHER PUBLICATIONS

Lee et al. "A Fast Edge Detector With Subpixel Accuracy", Proceedings of the Int. Conf. on Industrial Electronics, Control, Instrumentation, and Automation, vol. 2, Nov. 9, 1992, pp. 710–715.

Patent Abstracts of Japan, vol. 9, No. 85 (JP–A–59–214382), Apr. 13, 1985.

*Primary Examiner*—Jose L. Couso
*Assistant Examiner*—Matthew C. Bella
*Attorney, Agent, or Firm*—Fitzpatrick, Cella, Harper & Scinto

[57] ABSTRACT

In the invention, a plane region to which characters are output is divided into lattice-like elements (orthogonal lattice, triangular lattice, hexagonal lattice, etc.). In each element, an area ratio of the area to be output to the element is previously stored. The portion in the element in which the area ratio is equal to a first predetermined value (area ratio=0) is not output. The portion in the element in which the area ratio is equal to a second predetermined value (area ratio=1) larger than the first predetermined value is output. Further, the portion in the element in which the area ratio is larger than the first predetermined value and is smaller than the second predetermined value is regarded as a distribution of the continuous area ratio on the basis of the values of the area ratios of such an element and the elements therearound. The portion in which the area ratio is equal to or larger than a third predetermined value is output.

62 Claims, 21 Drawing Sheets

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 |
| 3 | 0 | 0 | 0.25 | 0.5 | 0.5 | 0.5 | 0.5 | 0.5 | 0.5 | 0.5 | 0.5 | 0.5 | 0.25 | 0 | 0 |
| 4 | 0 | 0 | 0.5 | 1 | 1 | 1 | 1 | 1 | 1 | 1 | 1 | 1 | 0.5 | 0 | 0 |
| 5 | 0 | 0 | 0.25 | 0.5 | 0.5 | 0.5 | 0.75 | 1 | 0.75 | 0.5 | 0.5 | 0.5 | 0.25 | 0 | 0 |
| 6 | 0 | 0 | 0 | 0 | 0 | 0 | 0.5 | 1 | 0.5 | 0 | 0 | 0 | 0 | 0 | 0 |
| 7 | 0 | 0 | 0 | 0 | 0 | 0 | 0.5 | 1 | 0.5 | 0 | 0 | 0 | 0 | 0 | 0 |
| 8 | 0 | 0 | 0 | 0 | 0 | 0 | 0.5 | 1 | 0.5 | 0 | 0 | 0 | 0 | 0 | 0 |
| 9 | 0 | 0 | 0 | 0 | 0 | 0 | 0.5 | 1 | 0.5 | 0 | 0 | 0 | 0 | 0 | 0 |
| 10 | 0 | 0 | 0 | 0 | 0 | 0 | 0.5 | 1 | 0.5 | 0 | 0 | 0 | 0 | 0 | 0 |
| 11 | 0 | 0 | 0 | 0 | 0 | 0 | 0.5 | 1 | 0.5 | 0 | 0 | 0 | 0 | 0 | 0 |
| 12 | 0 | 0 | 0 | 0 | 0 | 0 | 0.5 | 1 | 0.5 | 0 | 0 | 0 | 0 | 0 | 0 |
| 13 | 0 | 0 | 0 | 0 | 0 | 0 | 0.25 | 0.5 | 0.25 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 |

FIG.1

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 |
| 3 | 0 | 0 | 0.25 | 0.5 | 0.5 | 0.5 | 0.5 | 0.5 | 0.5 | 0.5 | 0.5 | 0.5 | 0.25 | 0 | 0 |
| 4 | 0 | 0 | 0.5 | 1 | 1 | 1 | 1 | 1 | 1 | 1 | 1 | 1 | 0.5 | 0 | 0 |
| 5 | 0 | 0 | 0.25 | 0.5 | 0.5 | 0.5 | 0.75 | 1 | 0.75 | 0.5 | 0.5 | 0.5 | 0.25 | 0 | 0 |
| 6 | 0 | 0 | 0 | 0 | 0 | 0 | 0.5 | 1 | 0.5 | 0 | 0 | 0 | 0 | 0 | 0 |
| 7 | 0 | 0 | 0 | 0 | 0 | 0 | 0.5 | 1 | 0.5 | 0 | 0 | 0 | 0 | 0 | 0 |
| 8 | 0 | 0 | 0 | 0 | 0 | 0 | 0.5 | 1 | 0.5 | 0 | 0 | 0 | 0 | 0 | 0 |
| 9 | 0 | 0 | 0 | 0 | 0 | 0 | 0.5 | 1 | 0.5 | 0 | 0 | 0 | 0 | 0 | 0 |
| 10 | 0 | 0 | 0 | 0 | 0 | 0 | 0.5 | 1 | 0.5 | 0 | 0 | 0 | 0 | 0 | 0 |
| 11 | 0 | 0 | 0 | 0 | 0 | 0 | 0.5 | 1 | 0.5 | 0 | 0 | 0 | 0 | 0 | 0 |
| 12 | 0 | 0 | 0 | 0 | 0 | 0 | 0.5 | 1 | 0.5 | 0 | 0 | 0 | 0 | 0 | 0 |
| 13 | 0 | 0 | 0 | 0 | 0 | 0 | 0.25 | 0.5 | 0.25 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 |

FIG.10

| 0 | 0.5 | 1 | 0.5 | 0 |
|---|---|---|---|---|
| 0 | 0.5 | 1 | 0.5 | 0 |
| 0 | 0 1 / 0 1 | 1 | 1 0 / 1 0 | 0 |
| 0 | 0 1 / 0 0 | 1 1 / 0 0 | 1 0 / 0 0 | 0 |
| 0 | 0 | 0 | 0 | 0 |

FIG.12A
| 1 | 1 | 0.75 | 0 | 0 |
|---|---|------|---|---|
| 1 | 1 | 0.75 | 0 | 0 |
| 1 | 1 | 0.75 | 0 | 0 |
| 1 | 1 | 0.75 | 0 | 0 |
| 1 | 1 | 0.75 | 0 | 0 |
FIG.12B
| 1 | 1 | 0.25 | 0 | 0 |
|---|---|------|---|---|
| 1 | 1 | 0.25 | 0 | 0 |
| 1 | 1 | 0.25 | 0 | 0 |
| 1 | 1 | 0.25 | 0 | 0 |
| 1 | 1 | 0.25 | 0 | 0 |
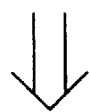
FIG.12C
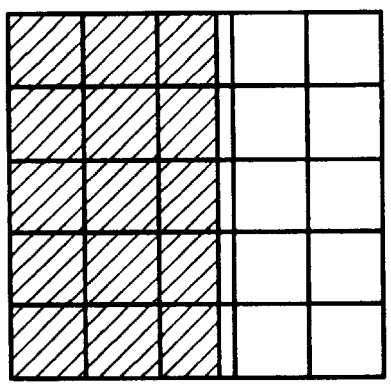
−
FIG.12D
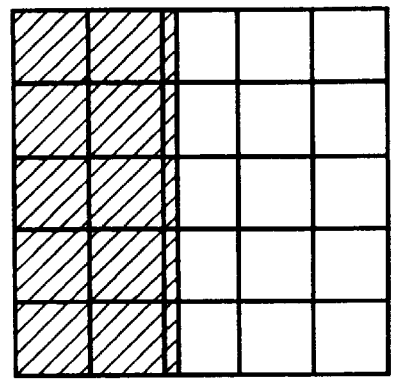
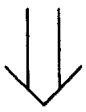
FIG.12E
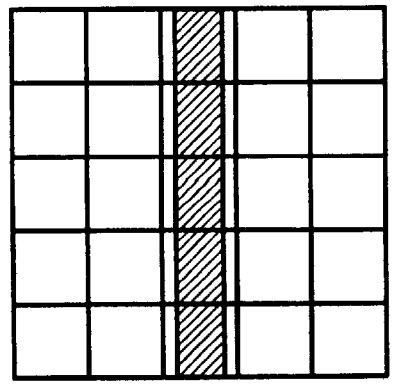

FIG.15

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 |
| 3 | 0 | 0 | 0 | 0 | 0 | 0.25 | 0.5 | 0.5 | 0.5 | 0.25 | 0 | 0 | 0 | 0 | 0 |
| 4 | 0 | 0 | 0 | 0 | 0 | 0.5 | 1 | 1 | 1 | 0.5 | 0 | 0 | 0 | 0 | 0 |
| 5 | 0 | 0 | 0 | 0 | 0 | 0.25 | 0.5 | 1 | 0.5 | 0.25 | 0 | 0 | 0 | 0 | 0 |
| 6 | 0 | 0 | 0 | 0 | 0 | 0 | 0.5 | 1 | 0.5 | 0 | 0 | 0 | 0 | 0 | 0 |
| 7 | 0 | 0 | 0 | 0 | 0 | 0 | 0.5 | 1 | 0.5 | 0 | 0 | 0 | 0 | 0 | 0 |
| 8 | 0 | 0 | 0 | 0 | 0 | 0 | 0.5 | 1 | 0.5 | 0 | 0 | 0 | 0 | 0 | 0 |
| 9 | 0 | 0 | 0 | 0 | 0 | 0 | 0.5 | 1 | 0.5 | 0 | 0 | 0 | 0 | 0 | 0 |
| 10 | 0 | 0 | 0 | 0 | 0 | 0 | 0.5 | 1 | 0.5 | 0 | 0 | 0 | 0 | 0 | 0 |
| 11 | 0 | 0 | 0 | 0 | 0 | 0.25 | 0.5 | 1 | 0.5 | 0.25 | 0 | 0 | 0 | 0 | 0 |
| 12 | 0 | 0 | 0 | 0 | 0 | 0.5 | 1 | 1 | 1 | 0.5 | 0 | 0 | 0 | 0 | 0 |
| 13 | 0 | 0 | 0 | 0 | 0 | 0.25 | 0.5 | 0.5 | 0.5 | 0.25 | 0 | 0 | 0 | 0 | 0 |
| 14 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 |

CHARACTER GENERATING METHOD AND APPARATUS USING DISCRIMINATION OF STORED FONT DATA

This application is a continuation of application Ser. No. 08/168,382, filed Dec. 17, 1993, now abandoned.

BACKGROUND OF THE INVENTION

1. Field of the Invention

The present invention relates to character output method and apparatus for generating a font pattern of a character which is used to display or print.

2. Related Background Art

Generally, to print an output character of an information processing apparatus of a computer, word processor, or the like, the shape of character is previously stored and, when it is output, the character must be reproduced in a form which can be read by human beings. As such a method, there are known a method of carving the shape itself of each character in the printing apparatus side and a method of storing each character as digital information in a processing apparatus or print apparatus.

As an example of the former method, a hammer type printer of a large scale computer, a daisy wheel type printer of a personal computer, or the like is known. As an example of the latter method, an impact printer of the dot matrix type, a thermal copy transfer printer, an ink jet printer, a laser beam printer of the electrophotographic type, or the like is known. As compared with the former method, the latter method has recently been the a main stream because several kinds of character shapes (what are called fonts) can be selected without exchanging a print head and a figure can be also easily formed.

As a method of storing the above-mentioned character shape as digital information, a method (vector font system) to store a skeletal structure of the character, a method (dot font system) to store the character as a binary image in a dot matrix form, or a method (outline font system or scalable font system) to store an outline of the character is used.

The dot font system is mainly used in case of displaying a middle or small character in a printer of a middle or low resolution. The vector font system is mainly used in a pen plotter. The outline font system is mainly used in a printer of a high resolution.

To handle a plurality of character type styles by those methods, it is fundamentally necessary to individually store shape data for every type style. There is, however, also a case of using a simple method such that an oblique character style is expressed by inclining the shape of an erect character style. In this case, a degree of inclination can be arbitrarily designated.

However, since the vector font system is a method of storing the skeletal structure of the character, there is a problem in that a character of a high quality cannot be expressed. The dot font system has a problem in that a number of dots are necessary to express a character of a high quality. The outline font system has a problem in that processes upon printing are complicated because the character outline is stored and the character is printed.

According to the above conventional methods, however, it is difficult to express an intermediate type style between two kinds of type styles excluding the case of a simple oblique character style or the like.

SUMMARY OF THE INVENTION

In consideration of the above conventional problems, it is an object of the invention to provide a character output method and apparatus in which a character of a high quality can be stored by a smaller capacity and can be reproduced by simpler processes as compared with those in the conventional dot font system.

Another object of the invention is to provide a character output method and apparatus, in which a plane region in which a character is printed is divided into lattice-like elements, an area ratio of the area to be printed in each element to the element is previously stored, the portion in the element in which the area ratio is equal to a first predetermined value is not output, the portion in the element in which the area ratio is equal to a second predetermined value larger than the first predetermined value is output, and further the portion in the element in which the area ratio is larger than the first predetermined value and is smaller than the second predetermined value is regarded as a distribution of the continuous area ratio on the basis of the values of the area ratios of such an element and the elements therearound, and the portion in which the area ratio is equal to or larger than a third predetermined value is output.

Still another object of the invention is to provide a character output method and apparatus in which a plurality of type styles and intermediate type styles between them can be stored and reproduced by a simple method.

Yet another object of the invention is to provide a character output method and apparatus in which a shape of a solid such that each of the cross-sections obtained by cutting a solid by a plurality of planes expresses a character shape of another type style is previously stored into a memory and, when a character is generated, the character shape is obtained by executing an image process to cut the solid at the cutting surface corresponding to a desired type style.

BRIEF DESCRIPTION OF THE DRAWINGS

FIG. 1 is an explanatory diagram showing a storing method of a character shape according to an embodiment of the invention;

FIG. 10 is an explanatory diagram showing an example in which an element of an edge portion of a stroke of a character is further divided;

FIGS. 12A to 12E are explanatory diagrams showing an example in which a line which is thinner than the element size is printed;

FIG. 15 is a diagram showing a volume ratio distribution of the character "I" in a special type style in the sixth embodiment;

DETAILED DESCRIPTION OF THE PREFERRED EMBODIMENTS

[First Embodiment]

An embodiment of the invention will now be described hereinbelow with reference to the drawings. FIG. 1 is an explanatory diagram showing a storing method of a character shape according to the first embodiment of the invention. A method of storing a character "T" is shown as an example. That is, a plane on which a character is printed is divided into square elements by a square lattice of (15×15). A numerical value written in each element indicates an area ratio (ratio of the area to be printed to the area of each element). In this embodiment, the values of the corners of both edges of a lateral stroke and the lower edges of a vertical stroke are set to 0.25, an outline is set to 0.5, the corners at which the outline crosses are set to 0.75, and the inside of the outline is set to 1.

Figure 2:
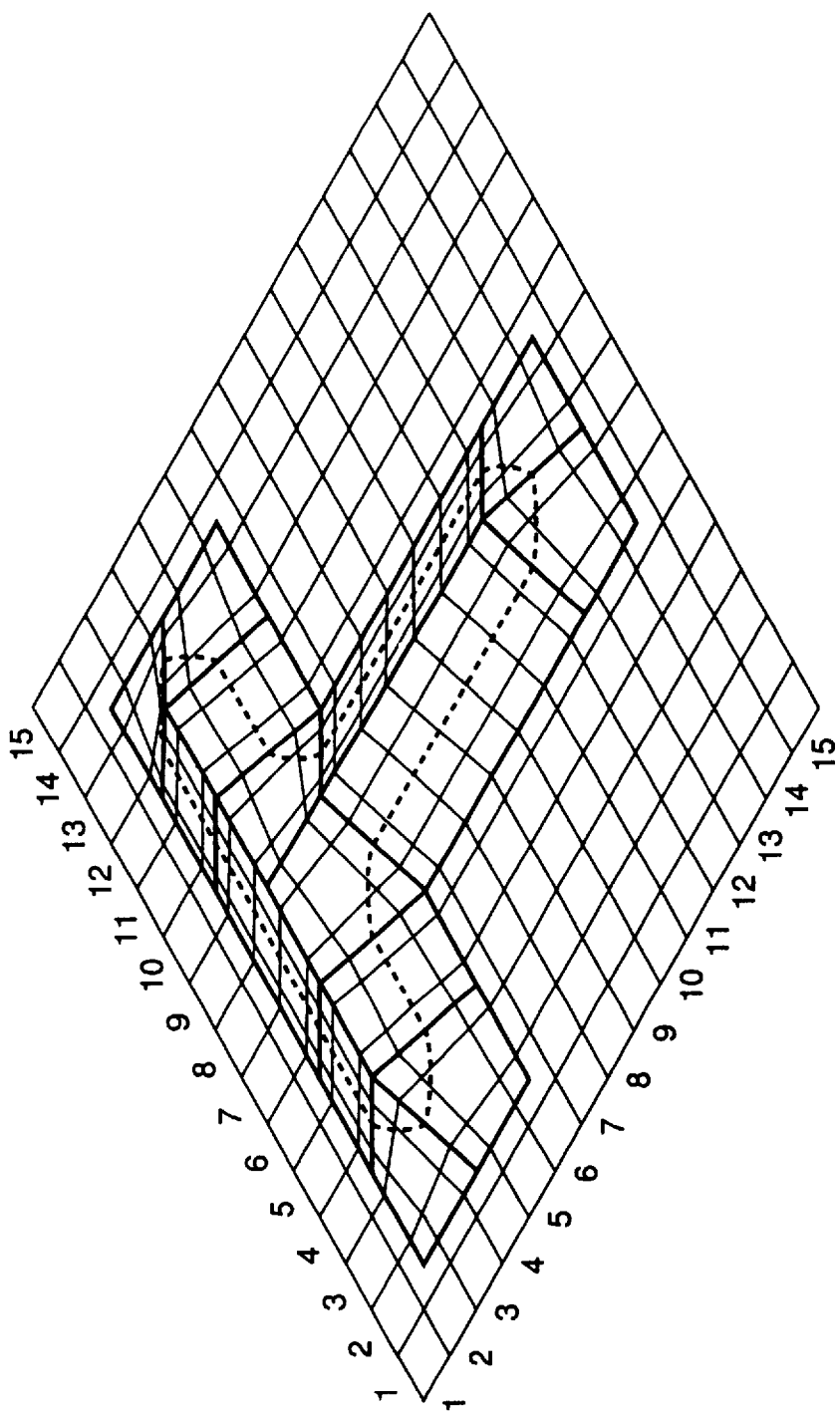
FIG. 2 is a diagram which three-dimensionally expresses the data obtained by the linear interpolation of data in FIG. 1.
Figure 3:
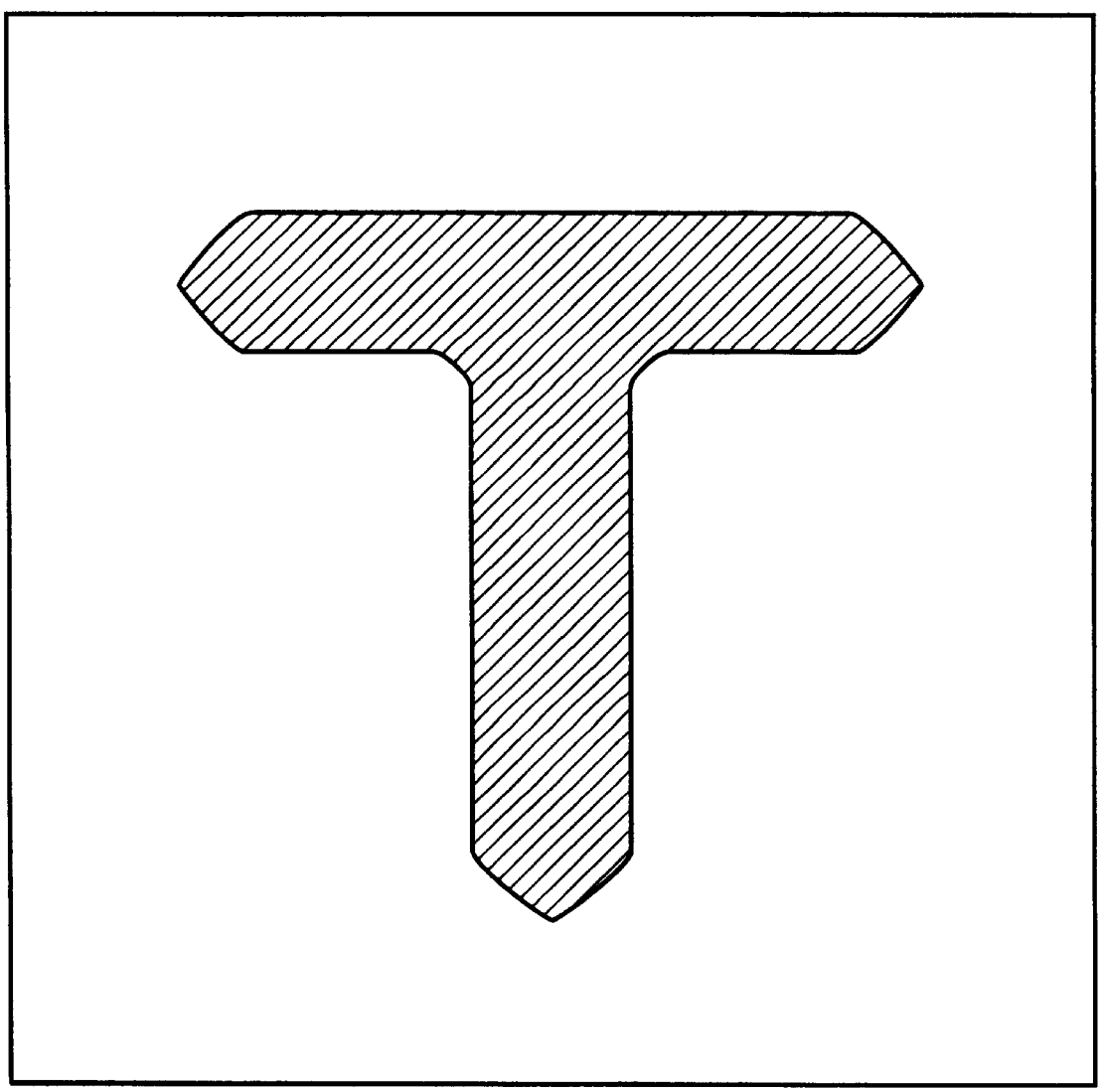
FIG. 3 is an explanatory diagram showing the character reproduced by the linear interpolation of the data in FIG. 1.

The value of an area ratio function $F(x, y)$ at a point $(x, y)$ of each of the above elements is defined so as to coincide with the area ratio of the element at the center of each element. The values of the area ratio function F at the points other than the center are bilinearly interpolated. When the bilinearly interpolated values are three-dimensionally expressed, they are as shown in FIG. 2 (height direction: F). When a contour line of F=0.5 is drawn, the corners are made round as shown in FIG. 3 and an outline of the character "T" is obtained. In the case of printing such a character by a dot matrix printer, it can be realized by printing points in the region of $F \geq 0.5$.

A method of storing the above data will now be described. In a case of using integer values G (=0 to 255) of eight bits in order to store the value of the area ratio function F in each element in FIG. 1, an expressing precision at the position of the outline of the character is equal to 1/255 of the element size. On the other hand, when each element is further finely divided by using a double memory capacity (16 bits) and the character is expressed by a binary dot matrix, since each element is divided into submatrixes of (4×4), the expressing precision at the position of the outline of the character is equal to about 1/4 of the element size. According to the above method, therefore, the character can be expressed at a high precision by a smaller capacity. According to this embodiment, a font can be also freely enlarged or reduced.

Figure 4:
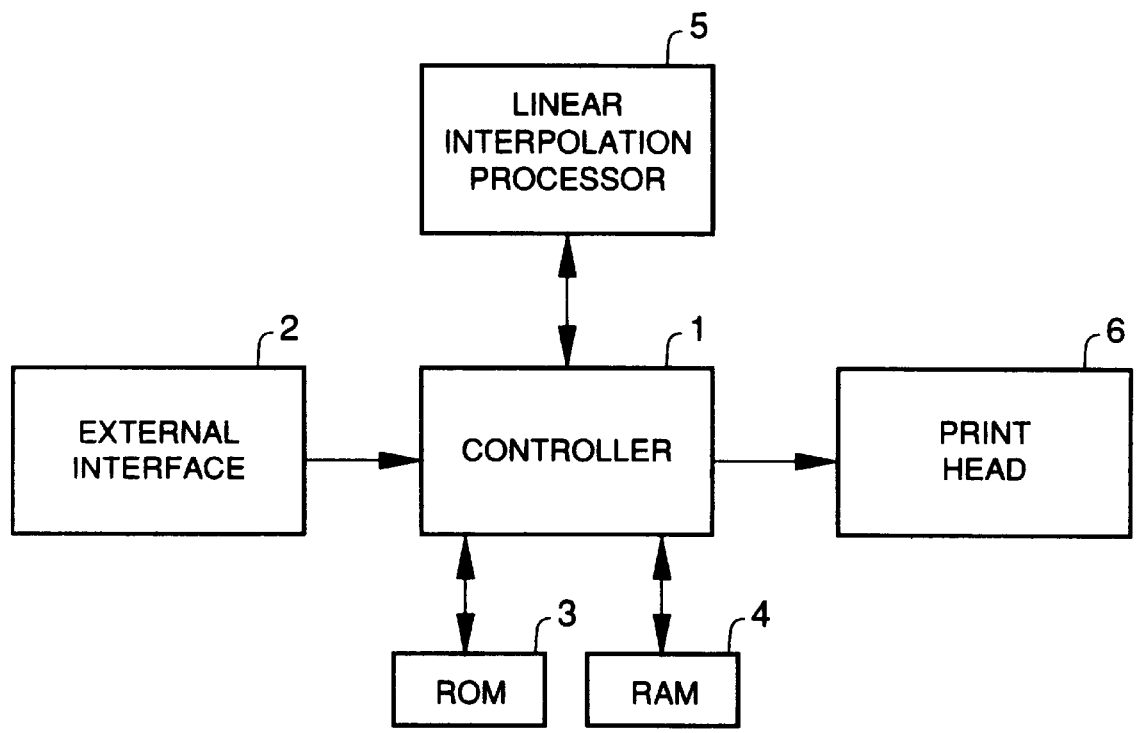
FIG. 4 is a block diagram showing a printing apparatus according to the invention.

FIG. 4 is a block constructional diagram of a dot matrix type printing apparatus according to the embodiment. When receiving a print command through an external interface 2, a controller 1 extracts the character shape data according to a character code from an ROM 3 or an RAM 4. Namely, the data expressing an area ratio in each element shown in FIG. 1 by eight bits has previously been stored as a character font in the ROM 3. Such character shape data is extracted from the ROM 3 or from the RAM 4 for registration of external characters. A linear interpolation processor 5 calculates the value of the area ratio function F corresponding to each print dot from the character shape data, thereby controlling so that a print head 6 prints the dots when $F \geq 0.5$ ($G \geq 128$).

Figure 5:
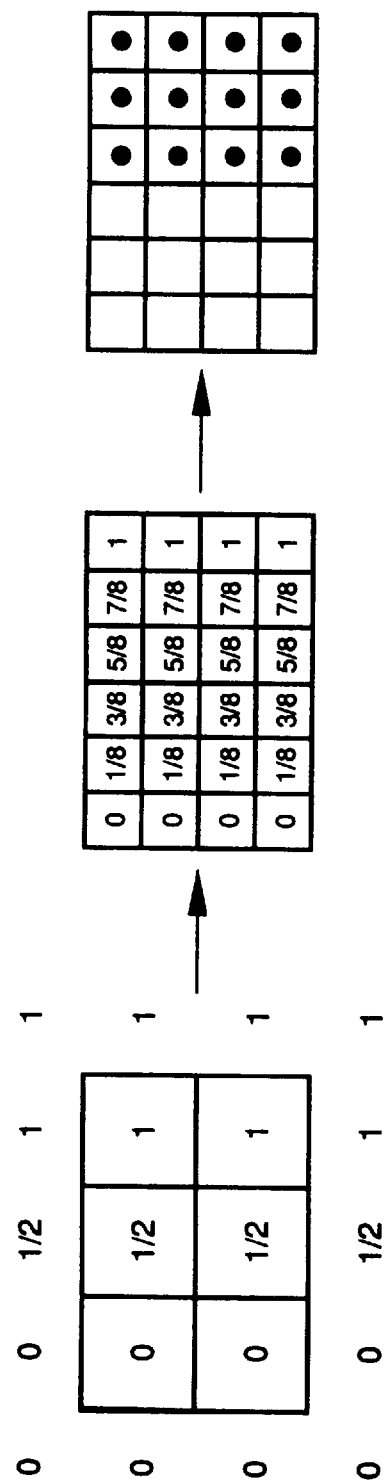
FIGS. 5A to 5C are diagrams showing a flow for developing data in FIG. 1 to dots.

Further specifically speaking, FIG. 5A shows partial elements (2×3) extracted from the elements (15×15) in the embodiment. In case of the edge data, the data must be supplemented in order to perform the bilinear interpolation. It is sufficient to previously store such supplementary data into the ROM 3 or RAM 4. FIG. 5B shows the result in the case where in order to actually output data on a dot unit basis, each element is divided on a unit basis of 2×2 (in this case, it is also possible to divide each element on a unit basis of 4×4, 16×16, or the like) and is bilinearly interpolated and the value (area ratio function F) of the central portion of each dot of a bit map memory (4×6) in the RAM 4 is calculated. FIG. 5C shows the result in the case where the dots at the positions of $F \geq 0.5$ in the bit map memory (4×6) in the RAM 4 were turned on in order to print the dots. The resultant data is transferred to a print buffer (not shown) and an image corresponding to the data can be printed by the print head 6.

As a method of storing the area ratio function F, it is not limited to the above 8-bit fixed point system or an arbitrary bit length can be used in accordance with a necessary precision. For example, another system such that the area ratio function F is divided into an exponential part and a mantissa part by using a floating point system and stored.

[Second embodiment]

Figure 6:
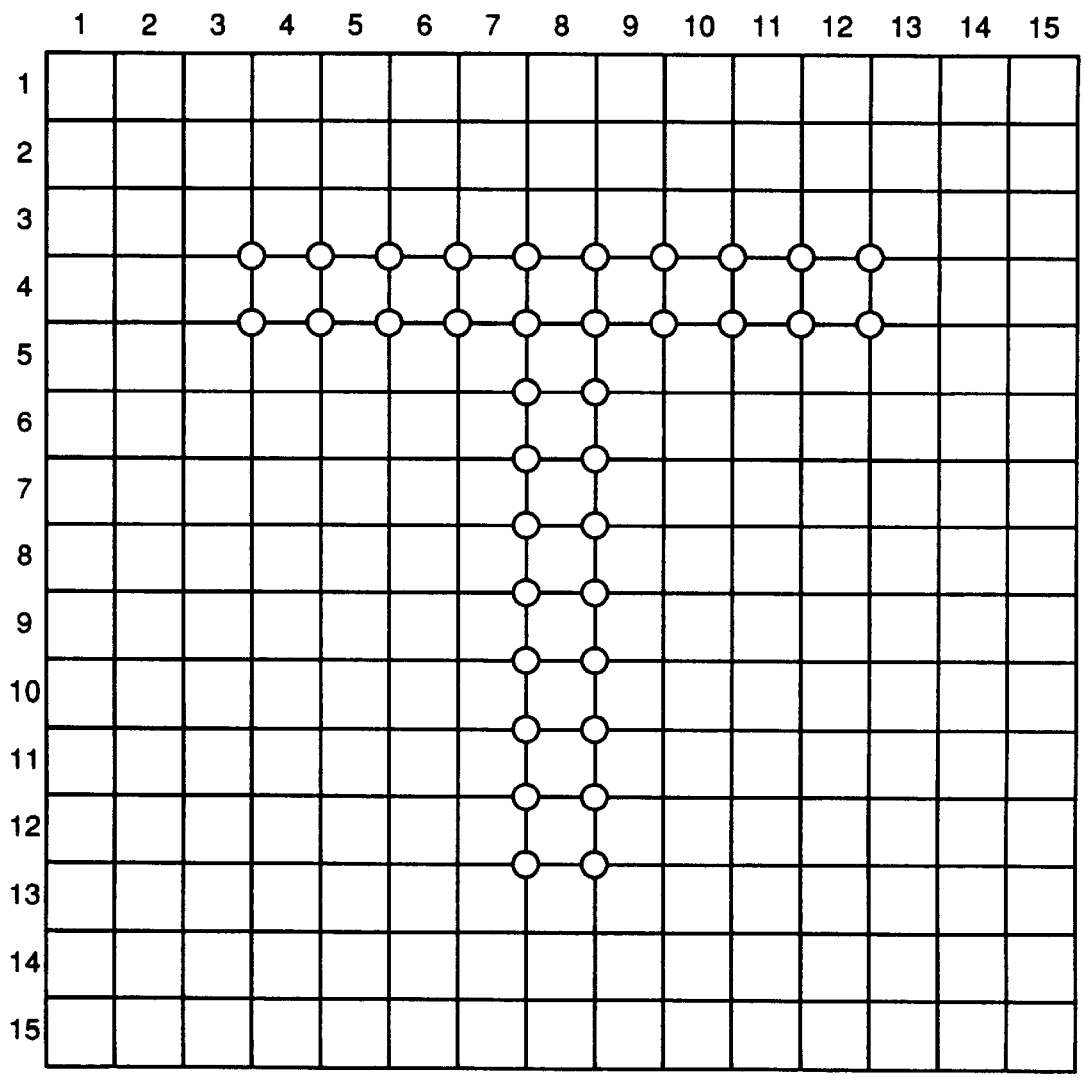
FIG. 6 is an explanatory diagram showing a storing method of a character shape of the second embodiment.
Figure 7:
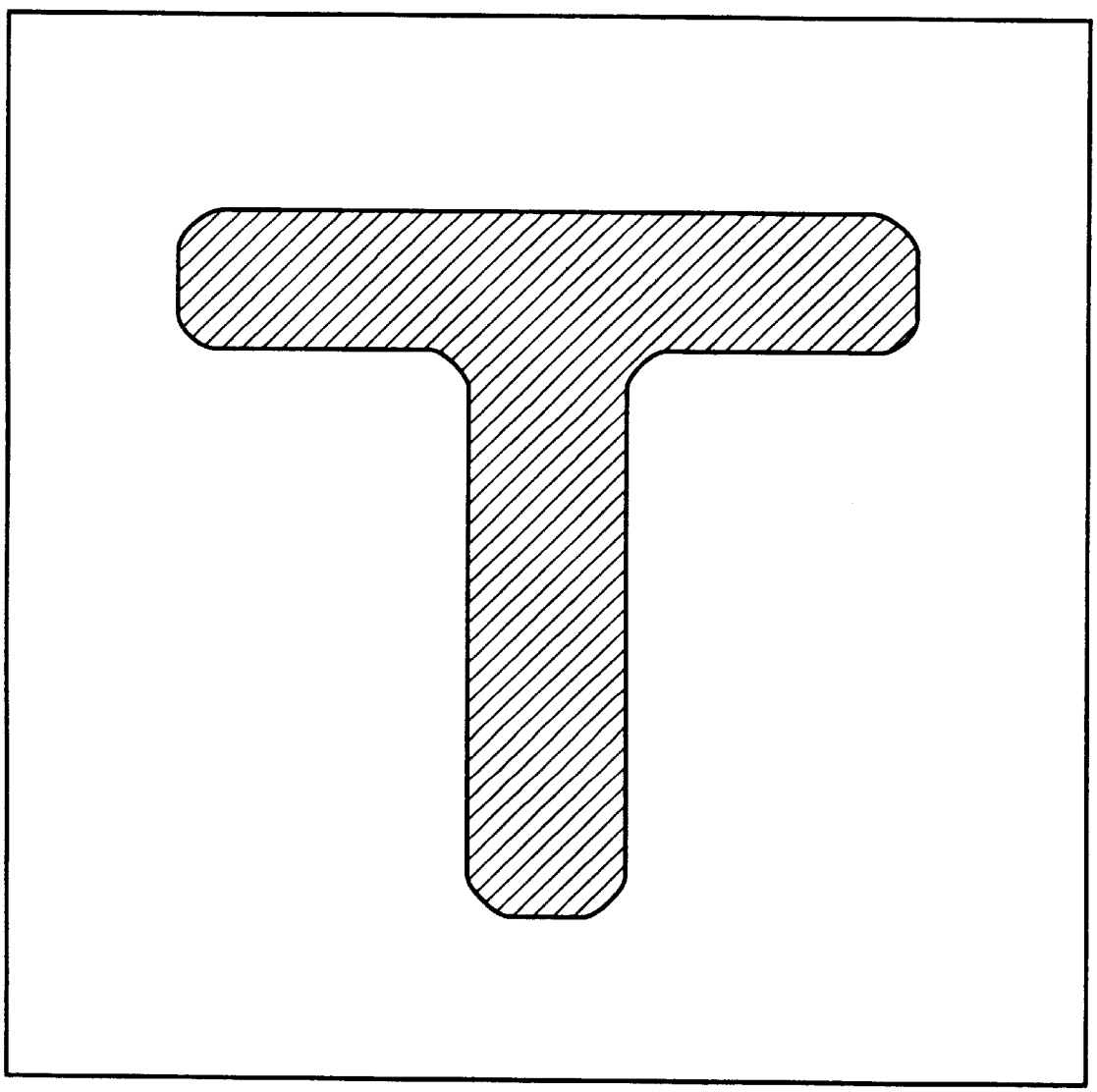
FIG. 7 is an explanatory diagram showing the character reproduced by the linear interpolation of data in FIG. 6.

FIG. 6 is an explanatory diagram showing a storing method of a character shape according to the second embodiment. Although a plane is divided into square elements by a square lattice of (15×15) in a manner similar to the first embodiment, the value of the area ratio is given by vertexes (lattice points) of the elements in the second embodiment. In FIG. 6, the area ratio at the lattice point indicated by a circle is equal to "1". The area ratios at the other lattice points are equal to "0". In a manner similar to the first embodiment, the value of the area ratio function $F(x, y)$ at the point $(x, y)$ of each of the elements is bilinearly interpolated by using the values at the vertexes and a contour line of F=0.5 is drawn, so that an outline of a character "T" as shown in FIG. 7 can be obtained.

Figure 8:
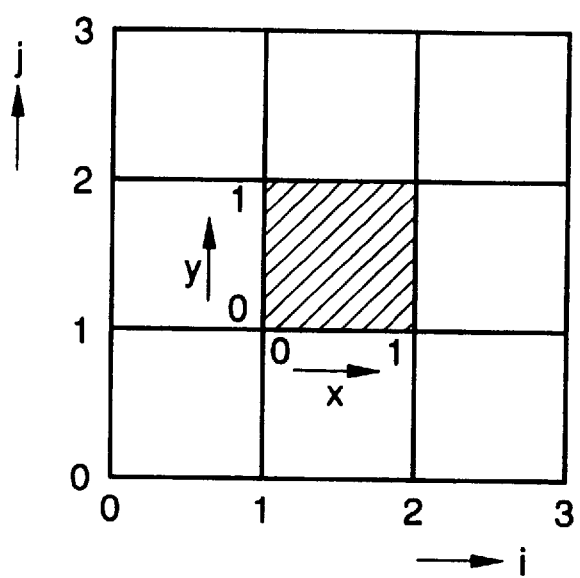
FIG. 8 is an explanatory diagram showing a method of interpolating an area ratio in an element shown in FIG. 6.

In the examples shown in the first embodiment (FIG. 3) and the second embodiment (FIG. 7), although the outline is not smooth in the edge portion of the character stroke, a smooth outline can be obtained by using an interpolation polynomial of a high degree. For instance, as shown in FIG. 8, when the value of the area ratio function $F(x, y)$ at the point $(x, y)$ in the central element shown by a hatched region is interpolated by an Overhauser's piecewise cubic polynomial as a C1 class function, it is expressed as shown by the equation (1).

$$F(x, y) = \sum_{i=0}^{3} \sum_{j=0}^{3} F_{i,j} \cdot E_i(x) \cdot E_j(y) \quad (1)$$

(x, y) denote local orthogonal coordinates ($0 \leq x \leq 1$, $0 \leq y \leq 1$); $F_{i,j}$ denotes the value of F at the vertex (i, j); and $E_0$, $E_1$, $E_2$, and $E_3$ denote interpolation functions shown by the following numerical equations (2) to (5).

$$E_0(x) = -0.5x + x^2 - 0.5x^3 \quad (2)$$

$$E_1(x) = 1 - 2.5x^2 + 1.5x^3 \quad (3)$$

$$E_2(x) = 0.5x + 2x^2 - 1.5x^3 \quad (4)$$

$$E_3(x) = -0.5x^2 + 0.5x^3 \quad (5)$$

By drawing a contour line of F=0.5 by the above method, a character of a smooth outline can be obtained as shown in FIG. 7.

As a form of the interpolation function, it is not limited to the numerical equations (2) to (5) but it is also possible to use, for example, another C1 class piecewise quadrature polynomial, Lagrangean polynomial, spline function, or the like. In case of using the spline function, a calculation amount upon reproduction can be reduced by storing the spline coefficients instead of the value of the area ratio itself. In case of using the cubic spline, the area ratio function F is expressed by a C2 class function. The "spline" is not what is called a spline curve in which a dot train to express the outline are displayed by one parameter but denotes the result obtained by performing a 2-variable spline interpolation to the area ratio function F as a function of x and y.

According to the invention, a preparation by the diffusion can be performed to the value of the area ratio function in order to further smoothly express the outline of the character. For instance, for the value of the area ratio function $F_{i,j}$ at the vertex (i, j), $\text{Fnew}_{i,j}$ can be obtained as shown by the following numerical equation (6).

$$\text{Fnew}_{i,j} = F_{i,j} + D(F_{i-1,j} + F_{i+1,j} + F_{i,j-1} + F_{i,j+1} - 4 \times F_{i,j}) \quad (6)$$

D denotes a diffusion coefficient which was made dimensionless and is generally selected to a value of 0.25 or less in consideration of the stability of an explicit diffusion scheme. Further, $\text{Fnew}_{i,j}$ obtained by the numerical equation (6) is set to the area ratio function $F_{i,j}$ and the numerical equation (6) can be used by only the necessary number of times. In order to prevent that the shape of the character is broken by the excessive diffusion, it is desirable to set a distance d as a target of the diffusion to $d \leq 1$. The value of d is obtained as shown by the following numerical equation (7) by using the diffusion coefficient D and the number n of diffusion processing times.

$$d = 2(D \times n)^{1/2} \quad (7)$$

Such a diffusing process is also effective even in case of forming a font according to the invention by using a character font for a dot matrix printer as a fundamental font. This is because jaggies which are peculiar to the character font for the dot matrix printer are smoothed by the diffusing process. As a diffusion scheme, a difference equation other than the numerical equation (6), for instance, an implicit scheme shown by the numerical equation (8) or the like can be used.

$$\text{Fnew}_{i,j} = F_{i,j} + D(\text{Fnew}_{i-1,j} + \text{Fnew}_{i+1,j} + \text{Fnew}_{i,j-1} + \text{Fnew}_{i,j+1} - 4 \times \text{Fnew}_{i,j}) \quad (8)$$

In this case, it is necessary to solve a matrix equation regarding Fnew.

[Third embodiment]

Figure 9:
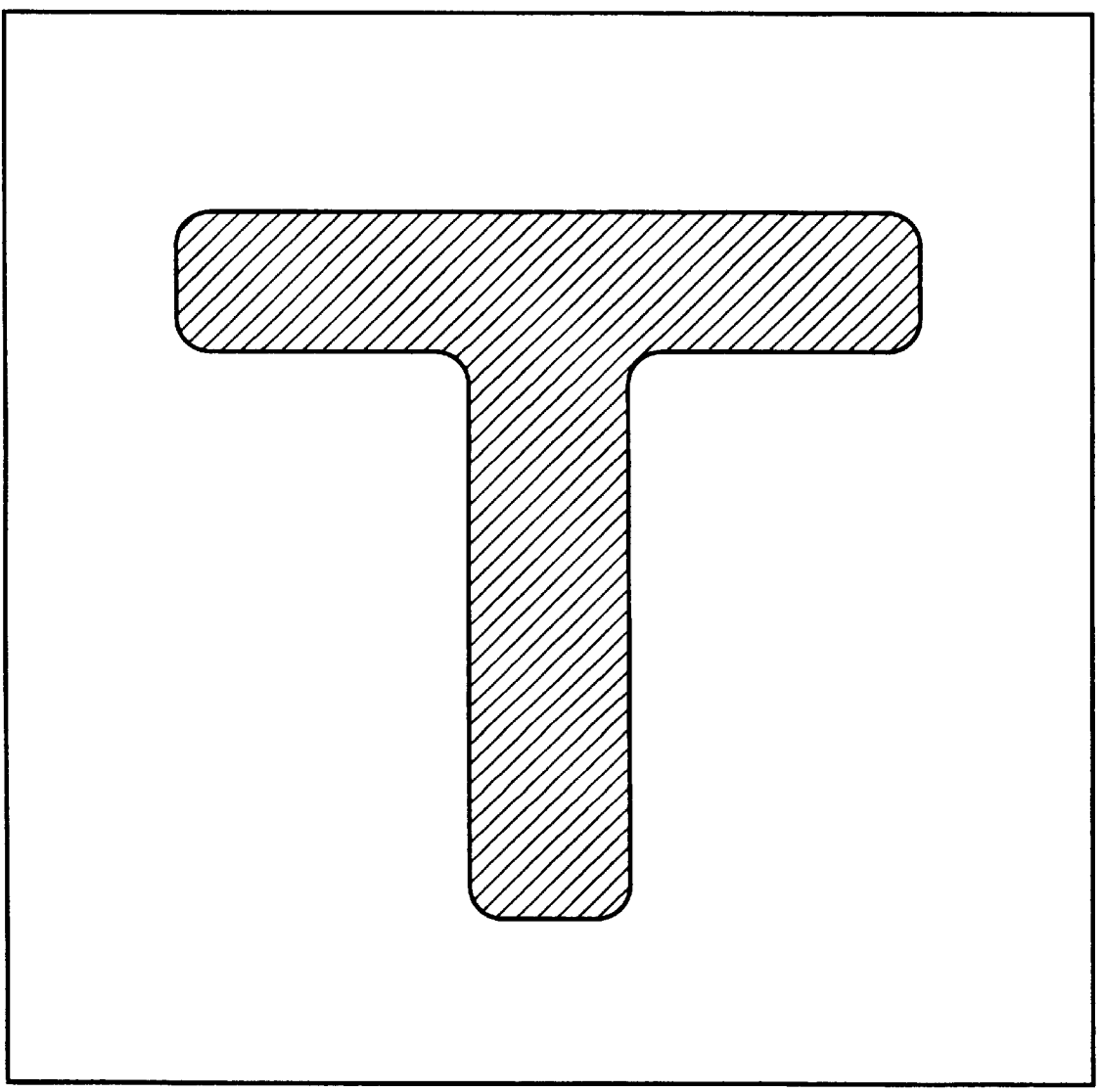
FIG. 9 is an explanatory diagram showing the character reproduced by performing an Overhauser's piecewise cubic polynomial of the data in FIG. 6.

In this case, for example, an image is reproduced as if the corners of the edge portions of the stroke of the character "T" shown in FIG. 9 are dropped. However, such a phenomenon can be prevented by finely dividing the elements in the edge portions of the stroke as shown in FIG. 10. That is, FIG. 10 shows an example in the case where the element in the lowest portion of the vertical stroke of the character "T" was finely divided. Such an element can be further finely divided as necessary. Information indicating which element was finely divided is separately stored. However, in the finely divided region, by reducing the number of bits which express the area ratio function F(x, y), an excessive increase in memory capacity can be prevented. For instance, in the case where each element is expressed by eight bits, it is sufficient that the finely divided region is expressed by four bits.

[Fourth embodiment]

Figure 11:
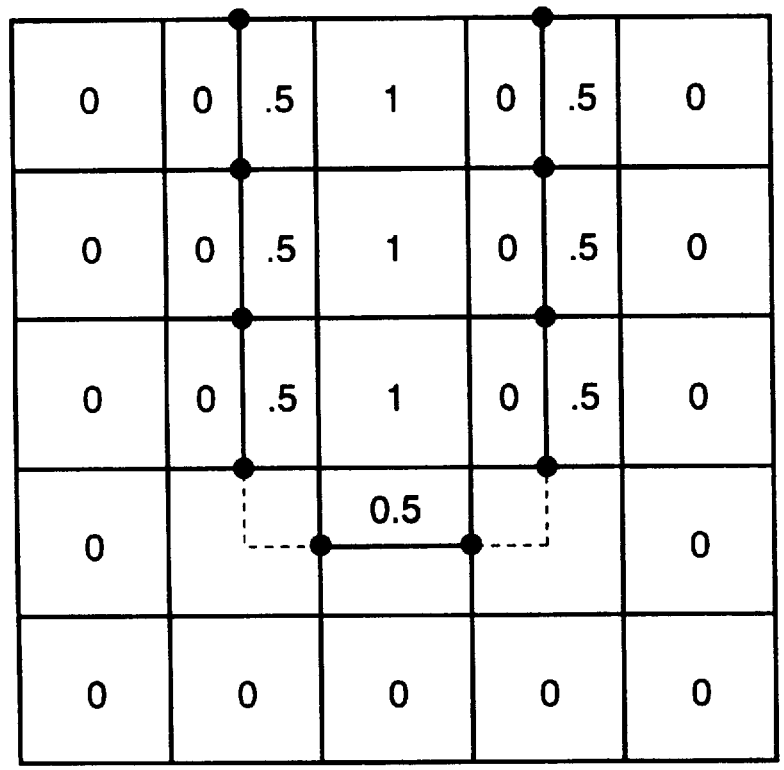
FIG. 11 is an explanatory diagram showing an example in which an outline of the edge portion of the stroke of the character is obtained by the extra-polation.

In order to obtain an outline of the stroke of the character, it is also possible to obtain points on the side of the element in which the area ratio is equal to 0.5 and to connect those points. In this case, those points can be connected by a straight line, spline curve, or the like. In case of sharpening the edge portion, by extrapolating the outline of the peripheral elements as shown by a broken line in FIG. 11, the character outline in the element can be obtained. In this case as well, it is sufficient that information indicating which element includes the outline of the character and information indicating that the extrapolation is executed from the outline in which one of the peripheral elements are separately stored into the ROM 4 or RAM 3.

[Fifth embodiment]

Further, by expressing one character by a plurality of area ratio matrices as shown in FIGS. 12A and 12B, a character of a thin stroke can be processed as shown in FIG. 12E. That is, FIGS. 12A to 12E show an example in which a line that is thinner than the size of element is expressed by a difference (FIG. 12C to FIG. 12D) of two area ratio matrices.

Figure 13A:
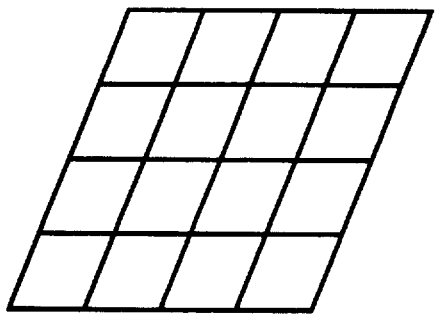
FIGS. 13A to 13F are explanatory diagrams showing other examples of a lattice.
Figure 13B:
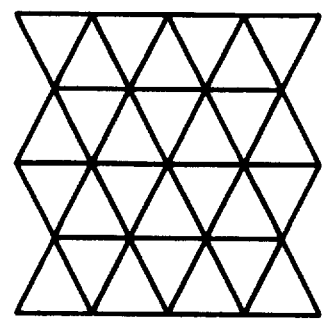
Figure 13C:
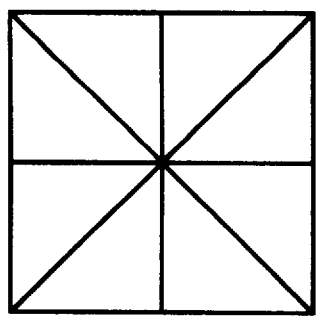
Figure 13D:
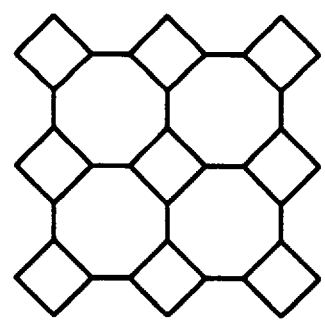
Figure 13E:
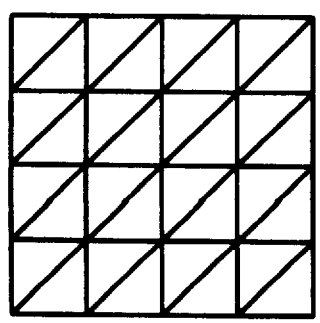
Figure 13F:
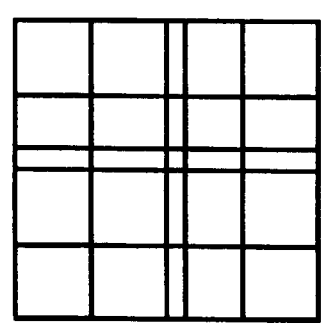

Although the embodiment has been described with respect to the case of using the orthogonal lattice as a lattice constructing the elements, a triangular lattice or a hexagonal lattice can be also used in place of the orthogonal lattice. Other lattices of various shapes or a combination thereof can be also used as shown in FIGS. 13A to 13F. For example, a lattice of a parallelogram shown in FIG. 13A is suitable in case of expressing an Italic character style. In this case, however, by storing the data of the type style without changing and by deforming the lattice upon reproduction, a character can be printed by an Italic character style.

[Sixth embodiment]

Figure 14:
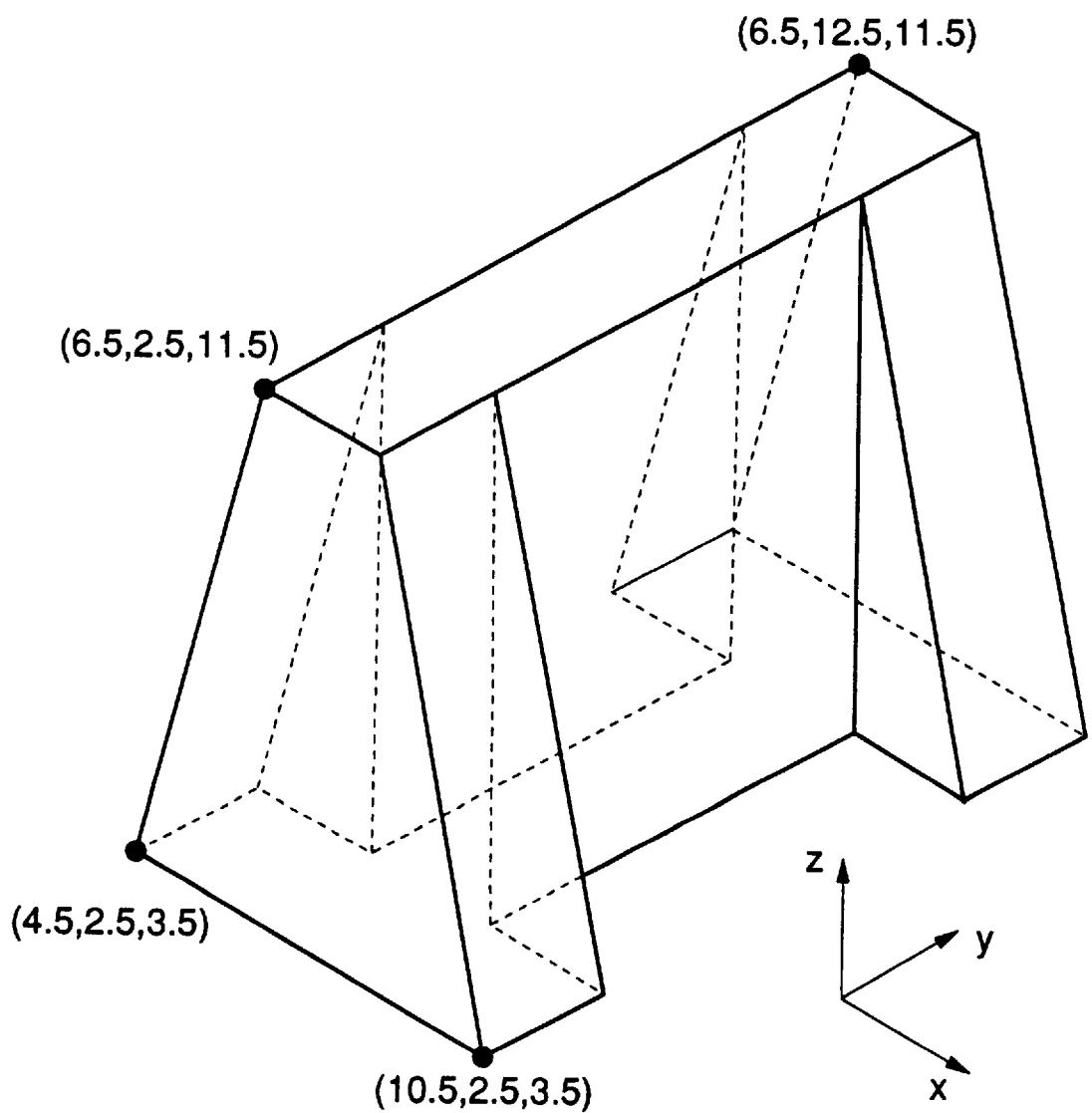
FIG. 14 is a diagram showing a storing method of a shape of a character "I" in various kinds of type styles in the sixth embodiment.

FIG. 14 is a diagram showing a method of expressing a character "I" as a solid in the sixth embodiment of the invention. In the sixth embodiment, by cutting the solid at a plane that is perpendicular to a z axis, the shape of the character "I" is obtained. By continuously moving the cut plane in parallel, a length of vertical lateral rod continuously changes and various different kinds of type styles are obtained.

Figure 16:
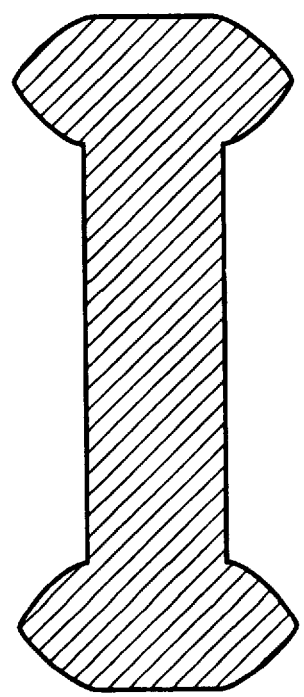
FIG. 16 is a diagram in which the shape of the character "I" is reconstructed by using the method of the sixth embodiment.

A space region ($0 \leq x \leq 15$, $0 \leq y \leq 15$, $0 \leq z \leq 15$) including such a solid is divided into elements by a cubic lattice (unit length is equal to 1) of 15×15×15 and stored into a memory in a character generator in a manner such that a ratio of the volume which is occupied in each element to the element volume, namely, a volume ratio can be reconstructed. The character shape when the solid is cut at a plane of z=7.5 can be reconstructed by a volume ratio distribution as shown in FIG. 15 at the eighth lattice plane from the bottom. By considering such that the value of the volume ratio function F at the point (x, y) is defined so as to coincide with the volume ratio of the element at the center of each element, the values of F at the other points are bilinearly interpolated and a contour line of F=0.5 is drawn, so that the outline of the character "I" is obtained as shown in FIG. 16.

To print the character by the dot matrix type printer, it is sufficient to print the dots by using the data of the region of F≧0.5. This method seems to be analogous to a binarizing method in what is called a multivalue image process for storing and reproducing an image with gradations as a multivalue image. However, those processes are quite different because the original image is limited to a character shape of two gradations having a clear outline. Generally, in the multivalue image process, the elements of a threshold value or larger are set to F=1 and the elements lower than the threshold value are set to F=0 and the position of the outline in the element is not searched. This is because in the multivalue image process, even if a density distribution as shown in FIG. 15 is given, whether the original image has a distinct outline like a character or has a smooth gradation cannot be known at a degree that is equal to or higher than the resolution (element size).

[Seventh embodiment]

Figure 17:
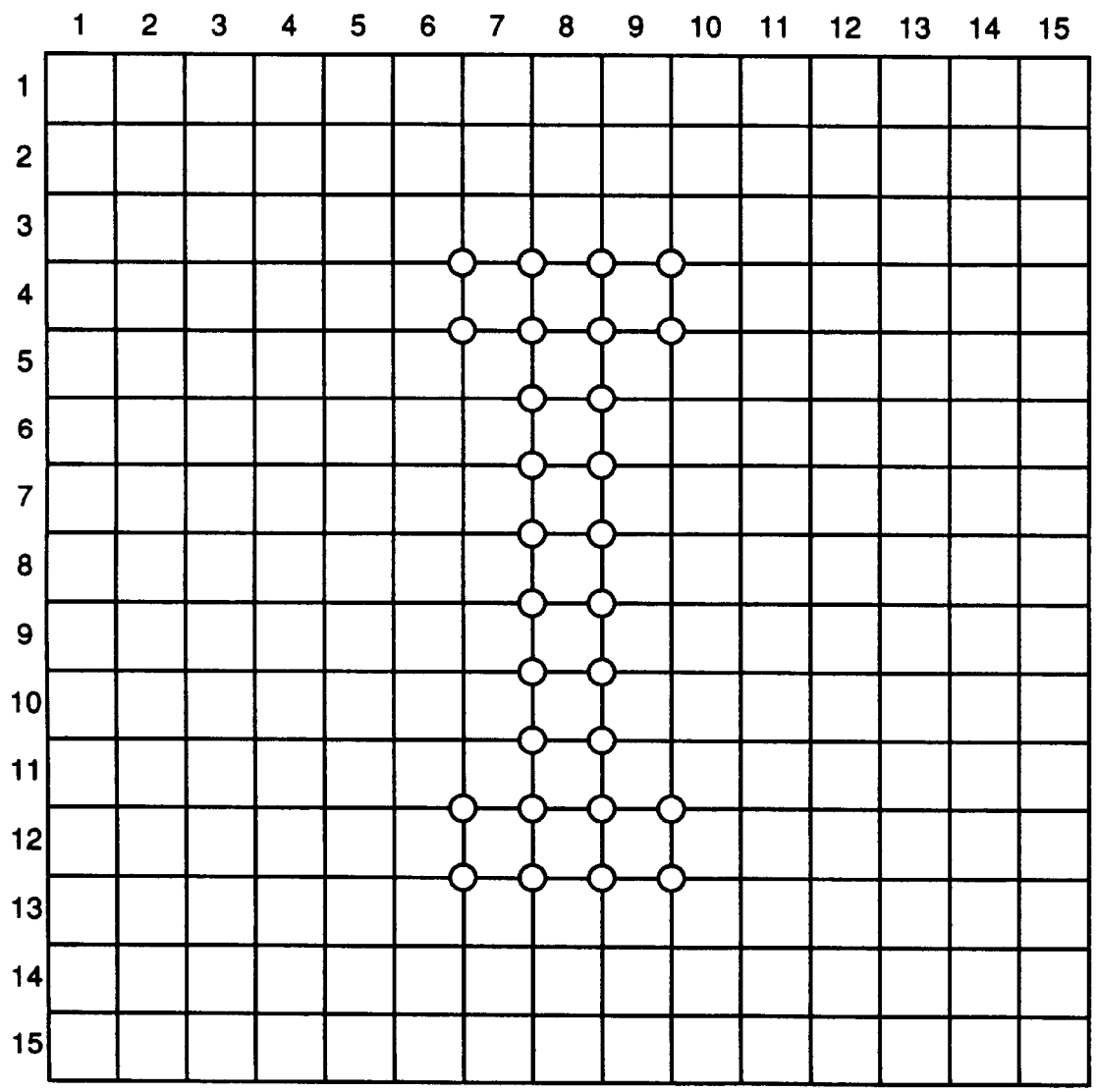
FIG. 17 is a diagram showing a volume ratio distribution of the character "I" in a special type style in the seventh embodiment.

In the seventh embodiment of the invention, in order to store the solid shape of FIG. 14, the value of the volume ratio is given at the vertex (lattice point or another point on the plane or side of the element or a combination thereof is also possible) of the element instead of the center of the element. A volume ratio distribution at z=7.5 is obtained as an average of the lattice points of z=7 and z=8 as shown in FIG. 17. By obtaining a contour line of F=0.5 by the linear interpolation on the basis of such a value, a character shape as shown in FIG. 18 is obtained.

Figure 18:
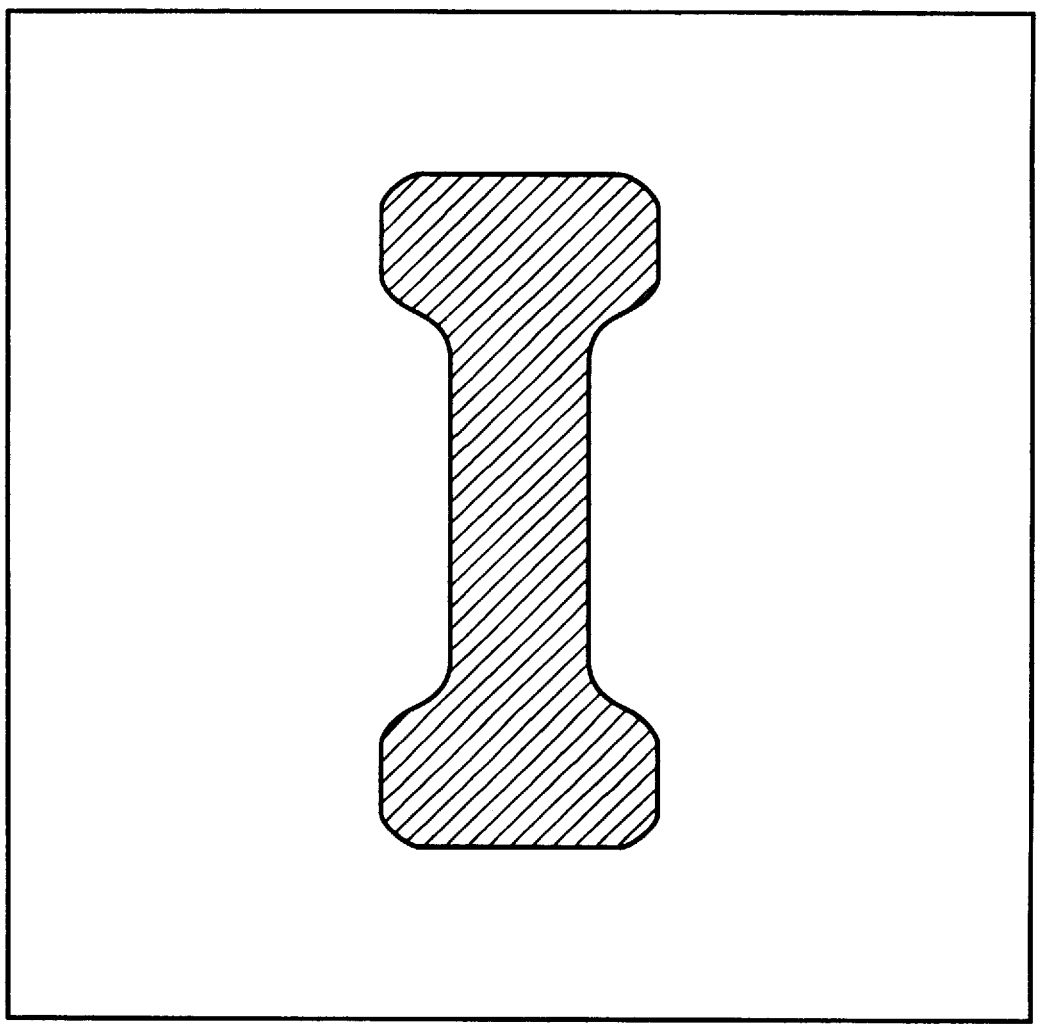
FIG. 18 is a diagram in which the shape of the character "I" is reconstructed by the linear interpolation in the seventh embodiment.
Figure 19:
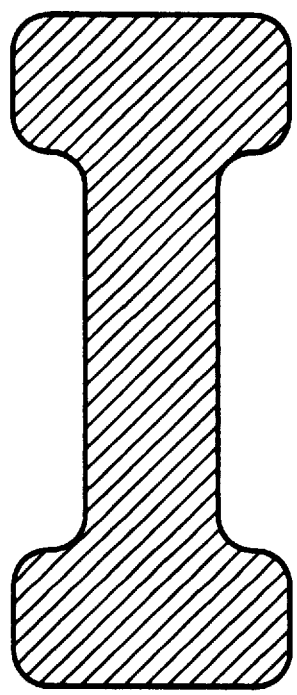
FIG. 19 is a diagram in a case of reproducing the shape of the character "I" by using an Overhauser's piecewise cubic polynomial in the seventh embodiment.

Although the outline in the edge portion of the character stroke is not smooth in FIG. 16 or 18, a smooth outline can be obtained by using an interpolation polynomial of a high degree. For example, in FIG. 8, when the value of the volume ratio function F(x, y) at the point (x, y) in the central element (hatched portion) is interpolated by using the Overhauser's piecewise cubic polynomial as a C1 class function, it becomes as shown by the numerical equation (1). (x, y) denote local orthogonal coordinates ($0 \leq x \leq 1$, $0 \leq y \leq 1$), $F_{i,j}$ denote the value of F at the vertex (i, j), and $E_0$, $E_1$, $E_2$, and $E_3$ indicate interpolation functions which are given by the numerical equations (2), (3), (4), and (5). By drawing a contour line of F=0.5 by the above method, a smooth outline as shown in FIG. 19 is obtained. As a form of the interpolation function, it is not limited to the numerical equations (2) to (5) but another function such as C1 class piecewise cubic polynomial, Lagrangean polynomial, spline function, or the like can be also used. In case of using the spline function, a calculation amount upon reproduction is reduced by storing spline coefficients instead of the value of the volume ratio itself. In case of the cubic spline, the volume ratio function is expressed by a C2 class function. It should be noted that the "spline" here is not what is called a spline curve such that a dot train expressing the outline are displayed by one parameter but indicates the result obtained by performing the 2-variable spline interpolation to the volume ratio function F as a function of (x, y).

To obtain a volume ratio distribution at an arbitrary z cut plane, it is sufficient to execute the linear interpolation by using the values of the volume ratio functions at the upper and lower lattice points. It is also possible to obtain as shown by the equation (9) by also using an Overhauser's piecewise polynomial in the z direction.

$$F(x, y, z) = \sum_{i=0}^{3} \sum_{j=0}^{3} \sum_{k=0}^{3} F_{i,j,k} \cdot E_i(x) \cdot E_j(y) \cdot E_k(z) \quad (9)$$

Further, a preparation by the diffusion can be also executed to the value of the volume ratio function in order to smoothly express the outline of the character. For instance, for the value of the volume ratio function $F_{i,j}$ at the vertex (i, j), Fnew$_{i,j}$ can be also obtained from the numerical equation (6). D denotes the diffusion coefficient which was made dimensionless and is generally selected to a value of 0.25 or less in consideration of the stability of the explicit diffusion scheme. The Fnew$_{i,j}$ obtained by the numerical equation (6) is set to $F_{i,j}$ and the numerical equation (6) can be used a proper number of times. To prevent that the shape of the character is broken by the excessive diffusion, it is desirable to set the value of d to 1 or less. d denotes the distance as a target of the diffusion and is expressed as shown by the numerical equation (7) by using the diffusion coefficient D and the number n of diffusion processing times.

Such a diffusing process is also effective to produce a type style by the method of the invention on the basis of the character type style for a dot matrix printer. This is because notches which are peculiar to the type style for the dot matrix printer are smoothed by the diffusing process. As a diffusion scheme, a difference equation other than the numerical equation (6), for example, an implicit scheme (numerical equation (8)) or the like can be also used. In this case, it is necessary to solve a matrix equation regarding Fnew$_{i,j}$.

Although only the diffusion in the xy plane has been considered in the numerical equations (6) and (8), it is also possible to include the diffusion in the z direction. In this case, the diffusion coefficient in the z direction is not necessarily the same as the diffusion coefficient in the xy plane.

[Eighth embodiment]

As a method of expressing a solid, the position of the solid surface can be also stored in addition to a method of using the volume ratio function as in the sixth and seventh embodiments. For this purpose, it is sufficient to express a curve surface by a piecewise polynomial by using the points to control the solid shape or the feature points on the solid surface. For example, it is possible to use a method such as spline curved surface, Bezier curved surface, Overhauser curved surface, or the like which is used in the CAD or computer graphics.

[Ninth embodiment]

Figure 20A:
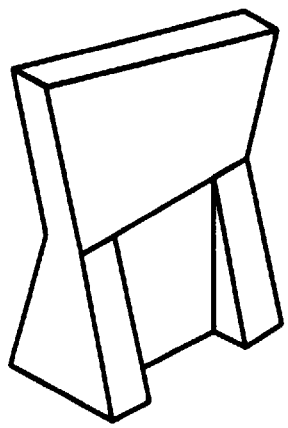
FIGS. 20A to 20D are diagrams showing solids each for expressing the character "I" in the ninth embodiment.
Figure 20B:
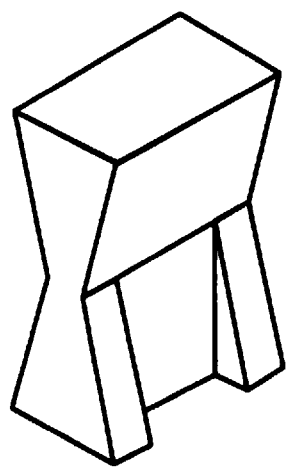
Figure 20C:
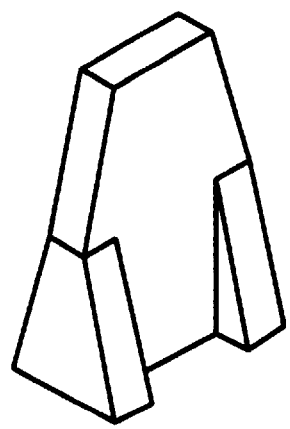
Figure 20D:
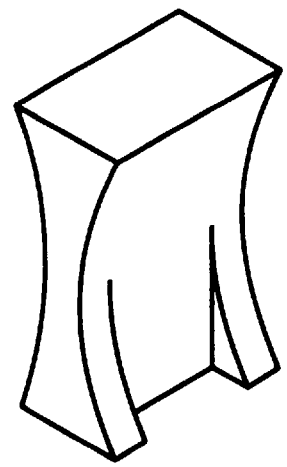

FIGS. 20A to 20D show various kinds of solids to express three kinds of type styles of the character "I" and their intermediate type styles. According to the shape of FIG. 20A, a portion to express an oblique character style of the character "I" is added onto the solid of FIG. 14. According to the shape of FIG. 20B, a portion to express a bold character style of the character "I" is added onto the solid of FIG. 14. According to the shape of FIG. 20C, a portion to express a character style in which a vertical length of the character "I" is short is added onto the solid of FIG. 14. According to the shape of FIG. 20D, although a type style similar to the shape of FIG. 20B is expressed, the type style changes nonlinearly (like a curve) and the shape is different from the shape of FIG. 20B. As mentioned above, three or more kinds of type styles and their intermediate type styles can be expressed by one solid.

Although the solid corresponding to the region to be printed has been considered so far, on the contrarily, it is also possible to consider a solid corresponding to the region which is not printed, namely, the portion in which the solid that is expressed in each of FIGS. 20A to 20D is eliminated from the space region. Further, it is also possible to consider a hollow solid and to express the character by the hollow portion.

The cut plane is not necessarily set to a horizontal plane. By cutting the solid at an angle that is inclined in the front/back direction or right/left direction, a character such that the type style changes in the vertical or lateral direction of the character can be also reproduced. Further, the cut plane can be also set to a curved plane.

[Tenth embodiment]

Figure 21:
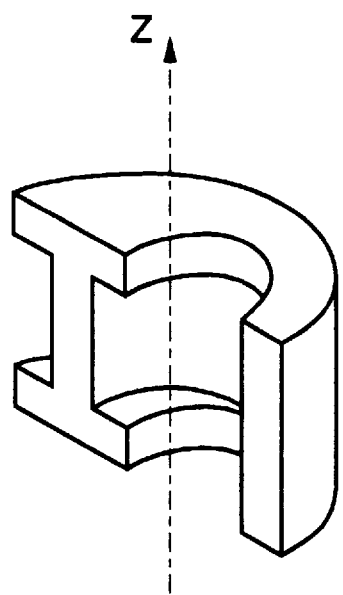
FIG. 21 is a diagram showing a solid for expressing the character "I" in the tenth embodiment.

In the tenth embodiment, the solid is not cut at planes which are parallel with each other but is cut at a plane including the z axis. FIG. 21 shows a solid to express the character "I" in various kinds of type styles in the case according to such a method.

[Others]

With respect to the plane at which the solid shape is cut, the relation between the kind of type style and the position of the cut plane, namely, the relation with the address of the data which is read out from the character font ROM 3 is predetermined. On the basis of such a correspondence relation, the controller 1 reads out the data from the character font ROM 3, thereby obtaining the plane data of the cut plane of the solid, that is, the character shape data.

In the embodiment, the font data produced has been transferred to the print buffer (not shown) and printed by the print head 6. However, it is also possible to transfer the produced font data to a VRAM (not shown) and to display by a display device such as liquid crystal display, CRT display, or the like (not shown).

As described above, according to the invention, the plane region to which a character is output is divided into lattice-like elements (orthogonal lattice, triangular lattice, hexagonal lattice, etc.). The area ratio of the area to be output in each element to the element is previously stored. The portion in the element in which the area ratio is equal to the first predetermined value (area ratio=0) is not output. The portion in the element in which the area ratio is equal to the second predetermined value (area ratio=1) larger than the first predetermined value is output. Further, the portion in which the area ratio is larger than the first predetermined value and is smaller than the second predetermined value is regarded as a distribution such that the area ratio continues on the basis of the values of the area ratios of such an element and its peripheral elements. The portion in which the area ratio is equal to or larger than the third predetermined value is output. Therefore, the outline of the character is expressed by the area ratio of the area to be output in each of the lattice-like elements to the element area. Thus, a character of a high quality can be output or a character can be also freely enlarged or reduced. By expressing the area ratio by a proper number of bits, it can be stored by a smaller capacity and can be reproduced by a simple process.

Further, according to the invention, since there are provided the memory means for storing the area ratio to the element area formed like a lattice, the arithmetic operating means for calculating the area ratio corresponding to the output dots, the output device to output the character, and the control means for generating an output command to the output device when the area ratio is equal to or larger than a predetermined value. Therefore, the above character output method can be simply and easily realized.

Further, as described above, according to the invention, since the character shapes of a plurality of kinds of type styles are stored in a form of solid shape, a plurality of character type styles and their intermediate type styles can be stored and reproduced by a smaller memory capacity and a simple arithmetic operation.

What is claimed is:

1. A method, to be performed using either hardware specific to the method or a computer programmed to perform the method, of generating a character using a memory which stores, as font data, area ratios for respective first areas obtained by dividing one character area, said method comprising the steps of:

dividing each of the first areas into a second area corresponding to a dot to be output;

deriving area ratio for the second area by interpolating the area ratio for the first area stored in the memory;

discriminating whether or not the derived area ratio for the second area is equal to or larger than a prescribed value; and writing a dot into the second area in response to said discriminating step discrimination that the derived area ratio for the second area is equal to or larger than the prescribed value, and writing no dot into the second area in response to said discriminating step discriminating that the derived area ratio for the second area is not equal to or larger than the prescribed value.

2. A method according to claim 1, wherein if said discriminating step discriminates that the value of the interpolated font data is equal to or larger than the prescribed value, said generating step generates the binary font data as dot data to be output, and otherwise said generating step generates binary font data as dot data not to be output.

3. A method according to claim 1 or 2, wherein the areas are represented by a square, a parallelogram, a triangle or a hexagon.

4. A method according to claim 1, wherein each of the areas is divided into a plurality of elements and area ratios for respective elements are stored in advance.

5. A method according to claim 1, 2 or 3, wherein the area ratio for one area is given at the center of the one area or a boundary between the one area and another.

6. A method according to claim 3, wherein the area ratio for one area is given at the center of the one area or a boundary between the one area and another.

7. A method according to claim 1, 2 or 3, further comprising the step of outputting a character pattern based on the generated binary font data.

8. A method according to claim 3, further comprising the step of outputting a character pattern based on the generated binary font data.

9. A method according to claim 5, further comprising the step of outputting a character pattern based on the generated binary font data.

10. A method according to claim 6, further comprising the step of outputting a character pattern based on the generated binary font data.

11. A method according to claim 1, wherein said deriving step includes interpolating the font data using a linear interpolation, a C1 class cubic interpolation, a Lagrangean interpolation, or a spline interpolation.

12. A method according to claim 7, wherein said outputting step outputs the character pattern using a printer.

13. A method according to claim 8, wherein said outputting step outputs the character pattern using a printer.

14. A method according to claim 9, wherein said outputting step outputs the character pattern using a printer.

15. A method according to claim 10, wherein said outputting step outputs the character pattern using a printer.

16. A method according to claim 7, wherein said outputting step outputs the character pattern using a display device.

17. A method according to claim 8, wherein said outputting step outputs the character pattern using a display device.

18. A method according to claim 9, wherein said outputting step outputs the character pattern using a display device.

19. A method according to claim 10, wherein said outputting step outputs the character pattern using a display device.

20. An apparatus for generating a character comprising:
   memory means for storing, as font data, area ratios for respective first areas obtained by dividing one character area;
   dividing means for dividing each of the first areas into a second area corresponding to a dot to be output;
   deriving means for deriving area ratio for the second area by interpolating the area ratio for the first area stored in said memory means;
   discriminating means for discriminating whether or not the area ratio for the second area derived by said deriving means is equal to or larger than a prescribed value; and
   writing means for writing a dot into the second area in response to said discriminating means discriminating that the area ratio for the second area derived by said deriving means is equal or larger than the prescribed value, and writing no dot into the second area in response to said discriminating means discriminating that the area ratio for the second area derived by said deriving means is not equal to or larger than the prescribed value.

21. An apparatus according to claim 20, wherein if said discriminating means discriminates that the value of the interpolated font data is equal to or larger than the prescribed value, said generating means generates the binary font data as dot data to be output, and otherwise said generating means generates binary font data as dot data not to be output.

22. An apparatus according to claim 20 or 21, wherein the areas are represented by a square, a parallelogram, a triangle or a hexagon.

23. An apparatus according to claim 20, wherein each of the areas is divided into a plurality of elements and area ratios for respective elements are stored in advance.

24. An apparatus according to claim 20, 21 or 23, wherein the area ratio for one area is given at the center of the one area or a boundary between the one area and another.

25. An apparatus according to claim 22, wherein the area ratio for one area is given at the center of the one area or a boundary between the one area and another.

26. An apparatus according to claim 20, 21 or 23, further comprising means for outputting a character pattern based on the generated binary font data.

27. An apparatus according to claim 22, further comprising means for outputting a character pattern based on the generated binary font data.

28. An apparatus according to claim 24, further comprising means for outputting a character pattern based on the generated binary font data.

29. An apparatus according to claim 25, further comprising means for outputting a character pattern based on the generated binary font data.

30. An apparatus according to claim 20, wherein said deriving means includes means for interpolating the font data using a linear interpolation, a C1 class cubic interpolation, a Lagrangean interpolation, or a spline interpolation.

31. An apparatus according to claim 30, wherein said output means comprises a printer.

32. An apparatus according to claim 27, wherein said output means comprises a printer.

33. An apparatus according to claim 28, wherein said output means comprises a printer.

34. An apparatus according to claim 29, wherein said output means comprises a printer.

35. An apparatus according to claim 26, wherein said output means comprises a display device.

36. An apparatus according to claim 27, wherein said output means comprises a display device.

37. An apparatus according to claim 28, wherein said output means comprises a display device.

38. An apparatus according to claim 29, wherein said output means comprises a display device.

39. A method, to be performed using either hardware specific to the method or a computer programmed to perform the method, of generating a character using a memory which stores, as font data, volume ratios for respective elements obtained by dividing one space area including a solid character by a cubic lattice, said method comprising the steps of:
   deriving volume ratios for respective first areas obtained by dividing an area in which a character is to be output obtained when the stored font data is cut at a desired plane;
   dividing each of the first areas into a second area corresponding to a dot to be output;
   deriving a volume ratio for the second area by interpolating the volume ratio for the first area stored in the memory;
   discriminating whether or not the derived area ratio for the second area is equal to or larger than a prescribed value; and
   writing a dot into the second area in response to said discriminating step discrimination that the derived area ratio for the second area is equal to or larger than the prescribed value, and writing no dot into the second area in response to said discriminating step discriminating that the derived area ratio for the second area is not equal to or larger than the prescribed value.

40. A method according to claim 39, wherein a plurality of type styles are expressed by cutting the space area at planes parallel to each other.

41. A method according to claim 39, wherein the character shape at a cut plane continuously changes as a cutting method continuously changes.

42. A method according to claim 39, wherein the volume ratio indicates a ratio of a volume of the solid character occupying each element to a volume of the each element.

43. A method according to claim 42, wherein one portion of the cubic lattice is divided into a plurality of pieces.

44. A method according to claim 42, wherein the volume ratio for one element is given at the center of the one element or a boundary between the one element and another.

45. A method according to claim 42, wherein a diffusion process is executed for a value of the volume ratio before deriving the volume ratio distribution.

46. A method according to claim 42, wherein said step of deriving the value for the second area includes interpolating the volume ration using a linear interpolation, a C1 class cubic interpolation, a Lagrangean interpolation, or a spline interpolation.

47. A method according to claim 39, further comprising the step of outputting a character pattern based on the generated binary font data.

48. A method according to claim 47, wherein said output step outputs the character pattern using a printer.

49. A method according to claim 47, wherein said output step outputs the character pattern using a display device.

50. A method according to claim 42, wherein for an element including an edge portion of a character stroke, a character outline is obtained by extrapolating the character outline in an element adjacent to that element.

51. An apparatus for generating a character comprising:

memory means for storing, as font data, volume ratios for respective elements obtained by dividing one space area including a solid character by a cubic lattice;

first deriving means for deriving volume ratios for respective first areas obtained by dividing an area in which a character is to be output obtained when the stored font data is cut at a desired plane;

dividing means for dividing each of the first areas into a second area corresponding to a dot to be output;

second deriving means for deriving a volume ratio for the second area by interpolating the volume ratio for the first area stored in said memory means;

discriminating means for discriminating whether or not the volume ratio for the second area derived by said second deriving means is equal to or larger than a prescribed value; and writing means for writing a dot into the second area in response to said discriminating means discriminating that the volume ratio for the second area derived by said deriving means is equal to or larger than the prescribed value, and writing no dot into the second area in response to said discriminating means discriminating that the volume ratio for the second area derived by said second deriving means is not equal to or larger than the prescribed value.

52. An apparatus according to claim 51, wherein a plurality of type styles are expressed by cutting the space area at planes parallel to each other.

53. An apparatus according to claim 51, wherein the character shape at a cut plane continuously changes as a cutting method continuously changes.

54. An apparatus according to claim 51, wherein the volume ratio indicates a ratio of a volume of the solid character occupying each element to a volume of each elements.

55. An apparatus according to claim 54, wherein one portion of the cubic lattice is divided into a plurality of pieces.

56. An apparatus according to claim 54, wherein the volume ratio for one element is given at the center of the one element or a boundary between the one element and another.

57. An apparatus according to claim 54 wherein a diffusion process is executed for a value of the volume ratio before said deriving means derives the volume ratio distribution.

58. An apparatus according to claim 54, wherein said second deriving means includes means for interpolating the volume ratio using a linear interpolation, a C1 class cubic interpolation, a Lagrangean interpolation, or a spline interpolation.

59. An apparatus according to claim 51, further comprising output means for outputting a character pattern based on the generated binary font data.

60. An apparatus according to claim 59, wherein said output means comprises a printer.

61. An apparatus according to claim 59, wherein said output means comprises a display device.

62. An apparatus according to claim 54, wherein for an element including an edge portion of a character stroke, a character outline is obtained by extrapolating the character outline in an element adjacent to that element.

* * * * *

UNITED STATES PATENT AND TRADEMARK OFFICE
CERTIFICATE OF CORRECTION

PATENT NO. : 5,850,488

DATED : December 15, 1998

INVENTOR(S) : AKIRA ASAI ET AL.

It is certified that error appears in the above-identified patent and that said Letters Patent is hereby corrected as shown below:

COLUMN 1

Line 15, "of" should read --of the--.
  Line 29, "a" should be deleted.

COLUMN 2

Line 64, "extra-polation" should read --extrapolation--.

COLUMN 4

Line 7, "an ROM 3 or an RAM 4." should read
     --a ROM 3 or a RAM 4.--.
  Line 38, "system" should read --system can be used--.

COLUMN 5

Line 28, "are" should read --is--.
  Line 39, "$+F_{i+1,j}F_{i,j-1}$" should read --$+F_{i+1,j}+F_{i,j-1}$--.
  Line 45, "by" should be deleted.

UNITED STATES PATENT AND TRADEMARK OFFICE
CERTIFICATE OF CORRECTION

PATENT NO. : 5,850,488

DATED : December 15, 1998

INVENTOR(S) : AKIRA ASAI ET AL.

It is certified that error appears in the above-identified patent and that said Letters Patent is hereby corrected as shown below:

COLUMN 6

Line 28, "that" should read --which of the peripheral elements--; and "outline" should read --outline of,--.
Line 29, "in which one of the peripheral elements are separately stored" should read --are separately stored--.
Line 58, "$(0 \leq x \leq 15,$" should read --$(0 \leq x \leq 15,$--.
Line 67, "such" should be deleted.

COLUMN 7

Line 42, "denote" should read --denotes--; and "$(0 \leq x \leq 15,$" should read --$(0 \leq x \leq 15,$--.
Line 43, "denote" should read --denotes--.
Line 57, "are" should read --is--.

COLUMN 8

Line 65, "on the contrarily," should be deleted.

UNITED STATES PATENT AND TRADEMARK OFFICE
CERTIFICATE OF CORRECTION

PATENT NO. : 5,850,488

DATED : December 15, 1998

INVENTOR(S) : AKIRA ASAI ET AL.

It is certified that error appears in the above-identified patent and that said Letters Patent is hereby corrected as shown below:

COLUMN 9

Line 30, "by" should read --it by--.
    Line 55, "since" should be deleted.

COLUMN 10

Line 36, "3," should read --4,--.
    Line 42, "3," should read --4,--.

COLUMN 11

Line 14, "area ratio" should read --an area ratio--.
    Line 25, "equal" should read --equal to--.

COLUMN 12

Line 60, "ration" should read --ratio--.

UNITED STATES PATENT AND TRADEMARK OFFICE
CERTIFICATE OF CORRECTION

PATENT NO. : 5,850,488

DATED : December 15, 1998

INVENTOR(S) : AKIRA ASAI ET AL.

It is certified that error appears in the above-identified patent and that said Letters Patent is hereby corrected as shown below:

<u>COLUMN 14</u>

Line 7, "elements" should read --element--.

Signed and Sealed this

Twenty-third Day of November, 1999

Attest:

Q. TODD DICKINSON

*Attesting Officer*    *Acting Commissioner of Patents and Trademarks*